US011087532B2

(12) United States Patent
Verret et al.

(10) Patent No.: US 11,087,532 B2
(45) Date of Patent: Aug. 10, 2021

(54) ORTHO-IMAGE MOSAIC PRODUCTION SYSTEM (71) Applicant: Raytheon Company, Waltham, MA (US)

(72) Inventors: Jody D. Verret, Rockwall, TX (US); Ali J. Arik, Allen, TX (US); Richard W. Ely, Lewisville, TX (US); Corey J. Collard, Plano, TX (US); Jerry O. Moore, Wylie, TX (US); Robert M. Willer, Garland, TX (US); Matthew A. Schaefer, Rowlett, TX (US); Robert T. Pierce, Wylie, TX (US); Stephen J. Raif, Sachse, TX (US); Grant B. Boroughs, Southlake, TX (US); James G. Hayes, Murphy, TX (US); Kevin M. Grange, State College, PA (US); Robert V. Opalecky, Royse City, TX (US); Mark J. Graebner, Dallas, TX (US)

(73) Assignee: Raytheon Company, Waltham, MA (US)

( * ) Notice: Subject to any disclaimer, the term of this patent is extended or adjusted under 35 U.S.C. 154(b) by 92 days.

(21) Appl. No.: 16/674,868

(22) Filed: Nov. 5, 2019

(65) Prior Publication Data
US 2021/0134055 A1 May 6, 2021

(51) Int. Cl.
G06T 17/05 (2011.01)
G06T 7/80 (2017.01)
(Continued)

(52) U.S. Cl.
CPC ............... *G06T 17/05* (2013.01); *G06T 3/20* (2013.01); *G06T 7/70* (2017.01); *G06T 7/80* (2017.01);
(Continued)

(58) Field of Classification Search
CPC .. G06T 17/05; G06T 7/80; G06T 7/70; G06T 3/20; G06T 11/001; G06T 2207/20212
See application file for complete search history.

(56) References Cited

U.S. PATENT DOCUMENTS 6,097,854 A * 8/2000 Szeliski ................. G06K 9/209
345/634
6,157,747 A * 12/2000 Szeliski ................. G06K 9/209
345/419

(Continued)

OTHER PUBLICATIONS

"SOCET GXP v4.4", BAE Systems, [Online]. Retrieved from the Internet: <URL: https://www.geospatialexploitationproducts.com/content/socet-gxp/>, (Accessed Nov. 19, 2019), 3 pages.

*Primary Examiner* — David T Welch (74) *Attorney, Agent, or Firm* — Schwegman Lundberg & Woessner, P.A.

(57) ABSTRACT

A system receives digital images of a geographic location, associates each digital image with ground control points in a set of reference stereo images, and associates each digital image to each other digital image via image to image tiepoints. The system updates a geometry of each image via a bundle adjustment, and uses a prioritized stacking order to establish piecewise linear seam lines between each of the images. The system finally builds a prioritized map in a mosaic space specifying the source image pixels that are used in each region of the output mosaic, and forms the mosaic image using the prioritized map.

20 Claims, 5 Drawing Sheets (51) Int. Cl.
  *G06T 7/70* (2017.01)
  *G06T 3/20* (2006.01)
  *G06T 11/00* (2006.01)

(52) U.S. Cl.
  CPC .. *G06T 11/001* (2013.01); *G06T 2207/20212* (2013.01); *G06T 2207/30181* (2013.01)

(56) References Cited

U.S. PATENT DOCUMENTS

| | | | | |
|---|---|---|---|---|
| 6,757,445 B1* | 6/2004 | Knopp | ............... | G01C 11/06 382/154 |
| 7,149,366 B1* | 12/2006 | Sun | ............... | G01J 3/02 382/284 |
| 8,879,813 B1* | 11/2014 | Solanki | ............... | A61B 3/14 382/128 |
| 10,410,321 B2* | 9/2019 | Ilic | ............... | H04N 5/2624 |
| 10,419,669 B2* | 9/2019 | Hornung | ............... | H04N 5/23206 |
| 10,708,491 B2* | 7/2020 | Ilic | ............... | H04N 5/23267 |
| 10,776,902 B2* | 9/2020 | Bergen | ............... | G06K 9/6215 |
| 2010/0201682 A1* | 8/2010 | Quan | ............... | G06T 15/04 345/419 |
| 2012/0114229 A1* | 5/2012 | Zhou | ............... | G06T 3/4038 382/164 |
| 2012/0154584 A1* | 6/2012 | Omer | ............... | H04N 5/23238 348/144 |
| 2012/0170842 A1* | 7/2012 | Liu | ............... | G06T 5/007 382/167 |
| 2014/0146173 A1* | 5/2014 | Joyce | ............... | G06K 9/0063 348/144 |
| 2014/0307045 A1* | 10/2014 | Richardt | ............... | G06T 3/4038 348/36 |
| 2015/0065803 A1* | 3/2015 | Douglas | ............... | A61B 1/00045 600/200 |
| 2016/0306824 A1* | 10/2016 | Lopez | ............... | G06T 3/4092 |
| 2018/0342100 A1* | 11/2018 | Mollis | ............... | G06T 15/205 |
| 2020/0193158 A1* | 6/2020 | Delp | ............... | B64C 39/024 |
| 2020/0327696 A1* | 10/2020 | Habib | ............... | G06T 7/80 |

* cited by examiner

ORTHO-IMAGE MOSAIC PRODUCTION SYSTEM

TECHNICAL FIELD

Embodiments described herein generally relate to generating ortho-image mosaics.

BACKGROUND

In digital image processing, for example the processing of satellite images of ground points, mosaic images are formed from many individual digital images. However, current techniques do not generate highly accurate geopositioned images with minimal shear at seam lines and do not balance image intensities. There is therefore a need to be able to produce, from a collection of individual images, an accurately geopositioned ortho mosaic image that minimizes pixel shear at the seam lines and balances image intensities across the mosaic.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings.

DETAILED DESCRIPTION

It is desirable to create an ortho-image mosaic system that produces, from a collection of individual digital images of a common ground space, an accurately geopositioned ortho mosaic image that minimizes pixel shear at the seam lines and balances image intensities across the mosaic. It is further desirable if this system scales on platforms or servers with multiple central processing units (CPUs). A goal behind an image mosaic generation embodiment is to create a new foundational layer of ortho-imagery that has newer content. It can be thought of as layers, where the old layers have old image pixels from a previous product, a previous system, and/or previous imagery and an embodiment is trying to update that with newer pixels that do not have infirmities such as clouds. For example, as will be explained in more detail herein, if there are clouds in a seam of the mosaic, an embodiment can exclude the clouds and expose the layer of pixels below that layer. These pixels may be from older imagery, but while a goal is to try to get the most current imagery in the new product or system, another goal is to generate cloud-free imagery. In short, it is desirable to generate the most recent imagery that is cloud free.

On occasion, new images without clouds do not exist. So in an embodiment, the older or non-current image can be retained in the system. In such cases, the amount of total cloud cover could still be much less than it used to be. Once again, the goal is to increase the currency of the images that are cloud-free. The best currency would be one wherein every pixel originates from the current time period. But, in light of the fact that an embodiment deals with earlier products and/or images, as long as the currency is increased somewhat, the system is being maintained and improved.

Another feature relating to cloud cover involves a ranking relating to the percentage of cloud cover. For example, if a newer image that has usable pixels is available, but this newer image has a lot of pixels with clouds in them and therefore will be excluded, the system can place that newer images behind another image that may be older, but which does not have the clouded pixels. The resulting image then looks a lot cleaner because there are fewer seams.

In an embodiment, an end-to-end script integrates all necessary algorithms and other steps into a single system, and minimizes the amount of manual user intervention that is needed to create mosaic images of a common ground space. This end-to-end flow is described in the following paragraphs.

Figure 1:
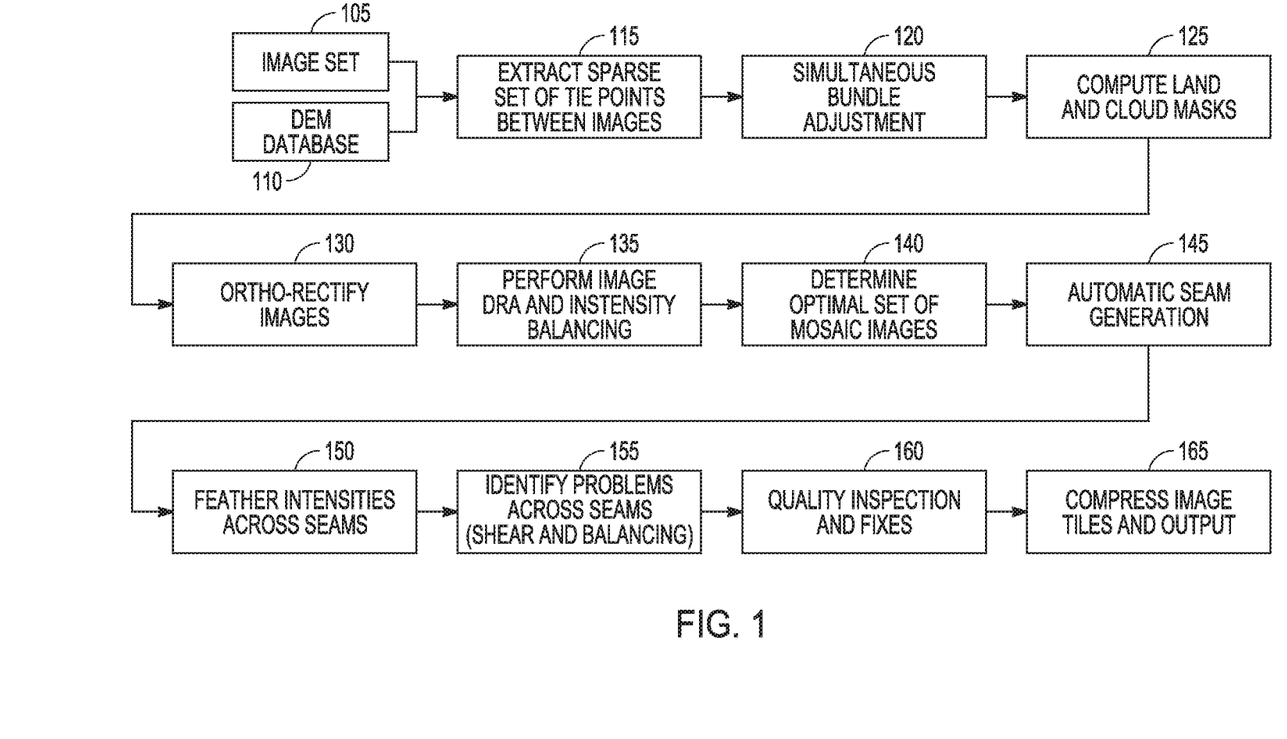
FIG. 1 is a block diagram of an example embodiment of generating a mosaic image from a plurality of images.
Figure 2A:
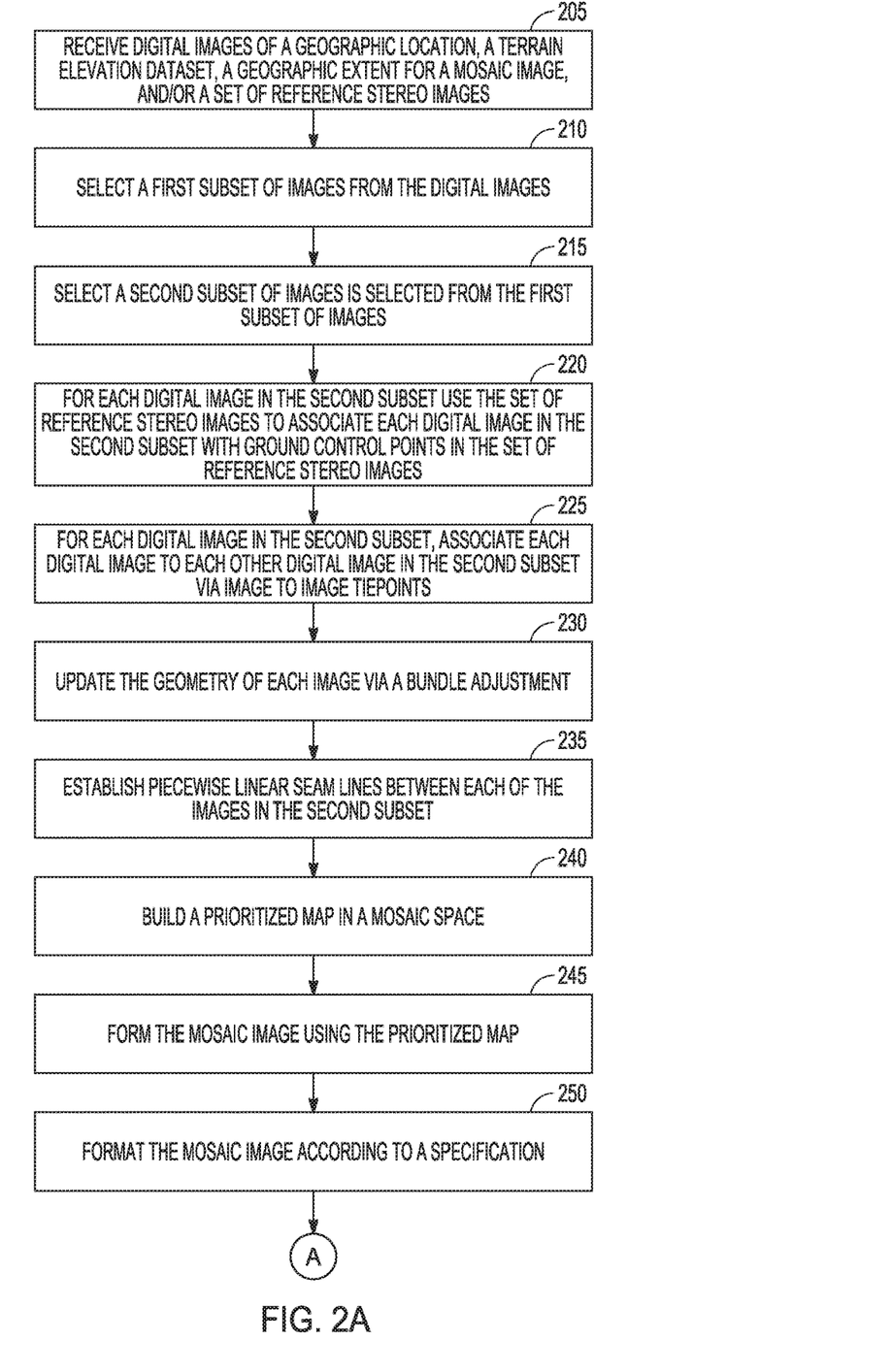
FIGS. 2A and 2B are a block diagram of another example embodiment of generating a mosaic image from a plurality of digital images.
Figure 2B:
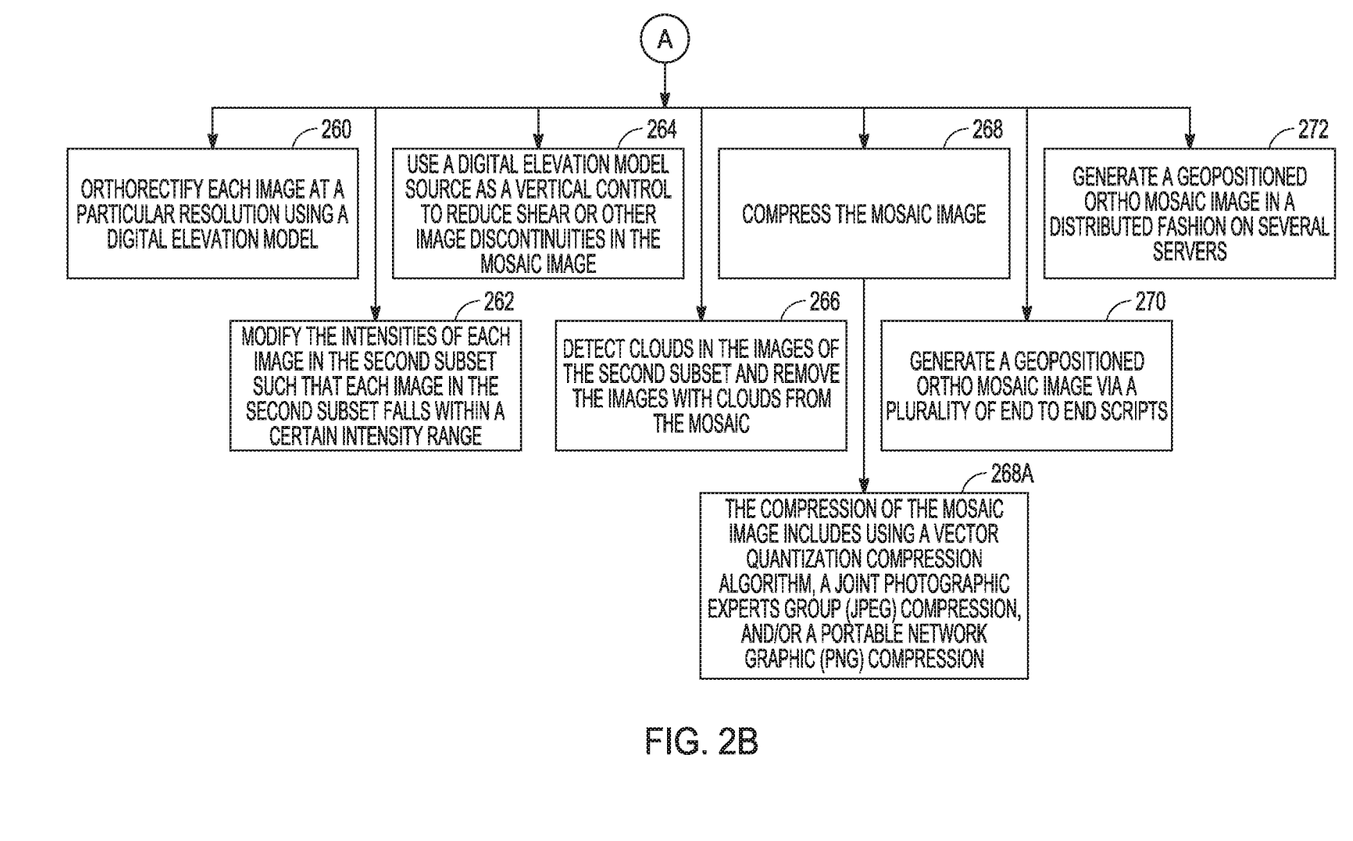

FIGS. 1, 2A and 2B are block diagrams illustrating operations and features of example systems and methods for generating a mosaic image from a plurality of images of a common ground space. FIGS. 1, 2A, and 2B include a plurality of process blocks 105-165 and 205-272. Though arranged substantially serially in the examples of FIGS. 1, 2A, and 2B, other examples may reorder the blocks, omit one or more blocks, and/or execute two or more blocks in parallel using multiple processors or a single processor organized as two or more virtual machines or sub-processors. Moreover, still other examples can implement the blocks as one or more specific interconnected hardware or integrated circuit modules with related control and data signals communicated between and through the modules. Thus, any process flow is applicable to software, firmware, hardware, and hybrid implementations.

Referring now specifically to FIG. 1, inputs to a system for generating ortho-image mosaics include an image set 105 and a digital elevation model (DEM) database 110. The DEM database can also be referred to as a terrain elevation database. Additional inputs can include a geographic extent for the mosaic and a set of reference stereo images with high geo-positional accuracy. The DEM or terrain elevation database includes a catalog of files in digital terrain elevation data (DTED) format. The geographic extent of the mosaic refers to a product extent defined in a product order manifest. For the set of reference images to be considered to possess high geo-positional accuracy, what is needed is a provided dataset that is accepted by the community at large to be accurate.

After the reception of the image set 105 and the DEM 110, a first step identifies which images to use in creating the mosaic. Specifically, the first processing step is to register all of these images together with tie points, that is, finding points in each image that look like the same place on the ground or other subject matter of the images. In an embodiment, the tie points are generated automatically by constructing a regular grid across the span of the full geographic extent of the product and sending these points through the automated image-to-image registration process mentioned above, and a bundle adjustment process (120) determines any errors in the tiepoints. If reference stereo imagery is available, each image in a prioritized list of source images is registered to the reference stereo imagery via ground control points (GCPs) and to each other via image-to-image tiepoints (115). As an alternative to using the reference stereo imagery for the reference data, the system can also use the digital elevation model (DEM) source as a vertical control in order to reduce shear (i.e., image discontinuities) in the output ortho-mosaic product. In an embodiment, a custom civilization information (CIV) format is used, which is a specific one degree by one degree, or half degree by half degree, square on the ground. Images with little or no ground overlap with the desired mosaic product space are discarded. Then the prioritized list of source images is determined based on currency. Currency refers to the concept that more recently collected images are better than older images. The prioritized list of source images is also determined based on collection geometry. That is, nadir collection of images (a point on the earth directly below an image sensing device) is better than a non-nadir collection of the images. The prioritized list of source images is further determined based on the percentage of cloud cover. In general, the less the cloud cover, the more desirable are the collected images. The prioritized list of source images is still further determined based on the general quality of the collected images and the ground footprints. Regarding the ground footprints, as noted above, images with no ground overlap are discarded, and images with more ground overlap are more desirable. An embodiment takes into consideration all of these factors, mixes and matches pixels from the images, and generates a best image from the current and older images.

The GCPs and tiepoints are used in a simultaneous photogrammetric bundle adjustment (120) to produce updated geometry for each image with improved geo-positional accuracy and to ensure that the images are geo-positionally consistent. The set of images that covers the area is registered together via the tiepoints. As noted, the tiepoints that are equal to each other are subjected to a bundle adjustment, wherein the tiepoints are subjected to a geolocation rational function and modified so that these tiepoints map to the same geographic position. The bundle adjustment ties the imagery to a set of provided truth images, and this results in a higher accuracy in the geolocation of the images. In an embodiment, these truth images can be generated by a government agency, such as the National Geospatial Agency (NGA), which executes a bundle adjustment over a large area, which results in stereo pair images that are the truth images. An embodiment then essentially ties a captured image set to the truth set through the bundle adjustment. The subset of collected images are tied to the older images of the reference images. At times, the truth imagery that is provided may have many clouds in various portions of the imagery and therefore may be completely unusable. However, in an embodiment, the system is still able to register the imagery. But newer, more current imagery is needed to make sure that there are not that many clouds in the images. In such an instance, a previous version of the system can be used to provide the truth images.

An automatic cloud detector is run on each collected image to produce a map of the cloud locations to ensure that cloud-covered pixels are kept to a minimum in the output mosaic product (125). In an embodiment, a cloud mask can be used in the image balancing (135) to generate a prioritized image stacking order. Specifically, using the digital elevation model (DEM) database, a portion of the ground in the elevation model is extracted so the entire database does not have to be queried each time the system processes the input images. This generates a first pass estimate of where all the clouds are, so that the parts of the images with clouds can be ignored at the time of balancing the mosaic image and creating the final product. Thereafter, each image is ortho-rectified (130) at the desired resolution (e.g., 1 meter). That is, the images are rotated to the north (that is, in an "up" direction), and every pixel is made equal in size so that the image is made to look as if the sensor is looking directly straight down to the ground (nadir). In an embodiment, the cloud mask is for the automatic balancing in connection with the ortho-rectification so that image balancing is not done with cloud pixels. The final product can further exclude clouded pixels via a manual process.

The ortho-rectified images are then subjected to intensity balancing (which can also be referred to as dynamic range adjustment (DRA)) (135) against a reference image so that all the images in the output product are in approximately the same intensity range. This minimizes radiometric differences that are intrinsic in the source images and results in an optimal set of mosaic images (140). Further, in image intensity balancing, if there is a previous or different embodiment, the system attempts to match intensities of neighboring pixels. For the intensity balancing, a least squares fit can be applied. A cluster of pixels is selected, and a current pixel value of the image is compared to the pixel value of the pixel in the same position in a previous image. This generates a slope intercept, and a least squares fit of all those points is executed on a per image basis. This is executed before the mosaic is generated. Each image will independently have its own slope and intercept to map to that previous image.

To determine the optimal set of mosaic images (140), as previously noted, working with newer images is preferable to working with older images, while removing as many clouds (and any other artifacts such as areas where there are bright pixels next to dark pixels) as possible. A manual process can be used to exclude things that are not desirable in the system. After the creation of these image exclusion areas, the mosaic process stacks all of these files together with the top layers being the newest, the bottom layers being the oldest, and the mosaic becomes completely full as one proceeds down into the layers. The system then calculates a theme, which is basically the outline of an image, because the system needs to know where every pixel comes from, the date of the pixel, the attributes of the pixel, and the attributes that came from that image that need to be propagated into the final product.

Then, using the prioritized stacking order of the images, wherein as described above the stacking order is based on the general image quality, nadir imagery, etc., piecewise linear seam lines between the images are established via an automatic or manual process (145). The automatic sorting algorithm only uses the date. The list can be manually edited due to other factors (i.e., cloud percentage and sun elevation data), but it is not fully automated. The prioritized stacking order relates to looking at the most current image first, and then going down to the least current image. It is weighted with the cloud percentage, but the highest factor is the currency and the date. As noted above, the amount of cloud cover affects the image quality. Also, the sun angle could affect the image quality. For example, a lower sun angle will generate longer shadows that could have an effect. Furthermore, with regard to the angle of the sun, an image that includes a body of water may include glints off of the water that make a particular portion of the image brighter than it should be. The angle of the sun is therefore another factor that can be mixed and matched in the generation of the mosaic.

Intensities across the seams are then feathered (150). The step of feathering intensities across seams involves the following. Anytime there is an edge between two images, the system has the ability to mix the two layers to reduce the effects of that seam to soften any harsh edges that may appear. Most of that should be removed because of the balancing, but occasionally there is something too bright or too dark in an image, and the single slope intercept isn't sufficient, and one image still ends up with an edge that can be easily seen. The feathering process blends the two images to reduce this effect.

Problems relating to shear and balancing across the seams are identified (155), and the images are then further inspected and fixed (160). Images that have shear with respect to the rest of the mosaic are removed because the automated process could not properly register them. The seam lines are then used to build a prioritized map in mosaic space that specifies which source image pixels are used in each region of the output mosaic. The mosaic image is then formed using this map. The prioritized map is just another way of identifying the mosaic image. The map file is the same size as the mosaic, and it has an index of which image was used in which part of the mosaic. There is therefore a knowledge of where each pixel came from, so that come intensity balancing time, it is known which pixels to compare against for each image individually, and this provides a better tracking to which images to load into the mosaic. However, if the mosaic has visual issues with it, the prioritized map can be used to determine from which image the problem pixels came.

Finally, the mosaic image is compressed (165). This compression can use a vector quantization compression (VQC) algorithm, a Joint Photographic Experts Group (JPEG) compression, or a Portable Network Graphic (PNG) compression, just to list a few examples. The compressed mosaic image is then formatted according to a product specification. The VQC data is formatted based on the CM product specification within a National Imagery Transmission Format (NITF) file.

Once the mosaic is generated, an embodiment allows for manually adjusting some of the balancing values, and looking for any harsh edges that show sheer. For example, if there is a straight line going through the image, like a road or a river, and one edge is slightly higher than the other edge, that is identified as a possible problem. Then, because the geolocation, the registration, and the bundle adjustment are known, the system can be analyzed to determine what caused the problem. For example, perhaps an image needs to be removed, or a newer image must be found. But if there is a seam that has a sheer, and it is under tolerance, the system or operator can decide to do nothing at that point in time and perhaps wait until the next new images become available to address the problem.

Many of the steps of the above-described process can be automated and chained together in an automated workflow script. The stereo reference images can be photogrammetrically controlled to an accurate reference source (either reference stereo imagery or the digital elevation model (DEM) itself). Many of the steps executed by the end-to-end script can be multi-threaded to allow for faster execution. The end-to-end script itself also allows a specified range of CPUs to be used, which can speed up the processing and allow the solution to be scaled according to the number of CPUs of the machine on which it is running. This can also allow multiple instantiations of the code to be run at once (especially on servers with a large number of cores) to generate multiple output products, without interfering with each other, or without interfering with other processes sharing the same machine. The script also allows only a portion of the end-to-end flow to be exercised. This script-based capability is of great operational, diagnostic, and developmental benefit when individual algorithm or parameter changes are made or when execution must be stopped and restarted.

Referring now to the embodiment of FIG. 2, a process to generate a geopositioned ortho mosaic image includes, at 205, receiving digital images of a geographic location, a terrain elevation dataset, a geographic extent for a mosaic image, and/or a set of reference stereo images. At 210, a first subset of images is selected from the digital images. This selection of the first subset includes images that have a ground overlap in common. At 215, a second subset of images is selected from the first subset of images. The selection of the second subset of images is based on the age of the digital images, the collection geometry of the digital images, the percentage of cloud cover associated with the digital images, the quality of the digital images, and/or the ground footprint of the digital images.

Operation 220 illustrates that, for each digital image in the second subset, the system, using the set of reference stereo images, associates each digital image in the second subset with ground control points in the set of reference stereo images. Similarly, operation 225 illustrates that, for each digital image in the second subset, the system associates each digital image to each other digital image in the second subset via image to image tiepoints.

At 230, the geometry of each image is updated via a bundle adjustment. The bundle adjustment generates images with improved geopositional accuracy and consistent geopositions. At 235, piecewise linear seam lines are established between each of the images in the second subset. These piecewise linear seam lines are established using a prioritized stacking order.

At 240, a prioritized map is built in a mosaic space. The prioritized map specifies the source image pixels that are used in each region of the output mosaic. At 245, the mosaic image is formed using the prioritized map, and at 250, the mosaic image is formatted according to a specification.

Additional operations in a process to generate a geopositioned ortho mosaic image are as follows. At 260, each image is orthorectified at a particular resolution using a digital elevation model (DEM). At 262, the intensities of each image in the second subset are modified such that each image in the second subset falls within a certain intensity range. At 264, a digital elevation model (DEM) source is used as a vertical control to reduce shear or other image discontinuities in the mosaic image. At 266, clouds are detected in the images of the second subset and the images with clouds are removed from the mosaic.

At 268, the mosaic image is compressed, and at 268A, the compression of the mosaic image includes using a vector quantization compression algorithm, a Joint Photographic Experts Group (JPEG) compression, and/or a Portable Network Graphic (PNG) compression.

At 270, the process to generate a geopositioned ortho mosaic image includes generating a geopositioned ortho mosaic image via a plurality of end to end scripts. At 272, the process to generate a geopositioned ortho mosaic image is executed in a distributed fashion on several servers. An advantage of operations 270 and 272, and in particular operation 272, is that the system scales to a much larger and faster system. This is in contrast to prior systems that are in general desktop-based. While a desktop computer may only have several processors, a server system can have hundreds of processors. The processing on a such a desktop system would take three to four times longer than on a server system.

Figure 3:
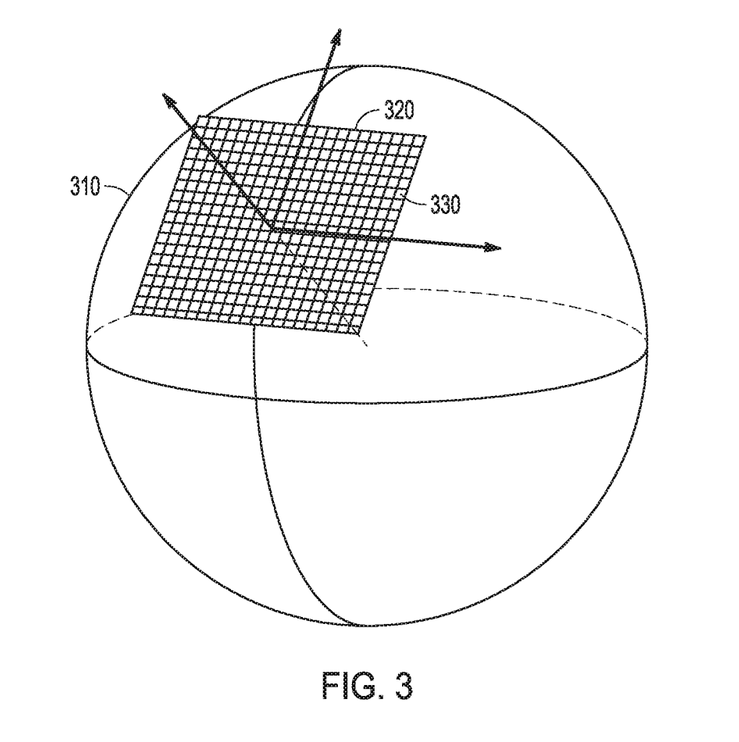
FIG. 3 is a graphical illustration of the ortho-mosaic image processes of FIGS. 1 and 2.
Figure 4:
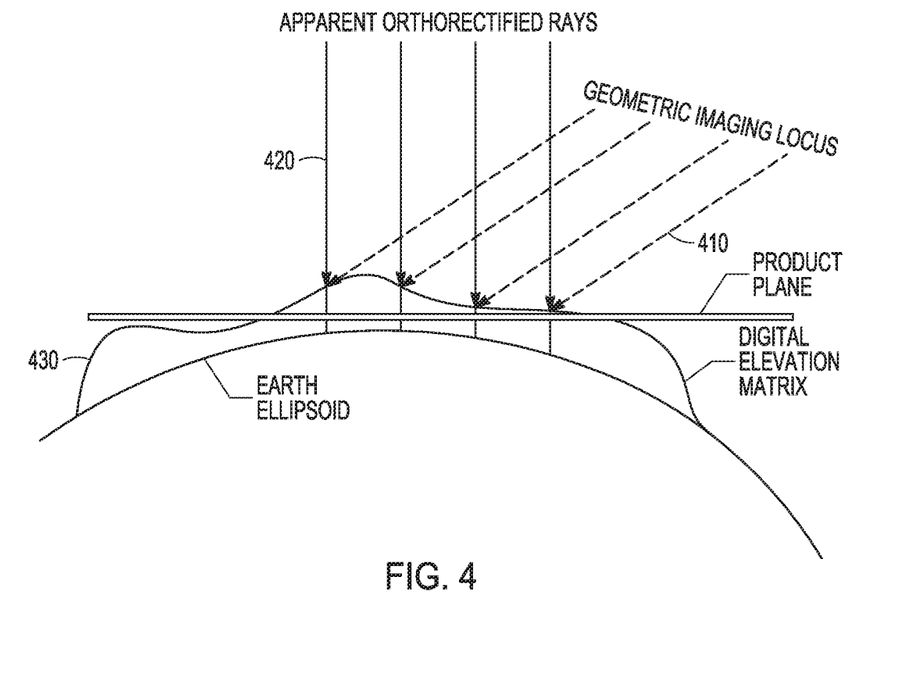
FIG. 4 is another graphical illustration of the ortho-mosaic image processed of FIGS. 1 and 2.

FIGS. 3 and 4 illustrate in a graphical sense the orthomosaic image processes of FIGS. 1 and 2. FIG. 3 illustrates in a perspective view the earth ellipsoid 310, and the tangent plane frame 320 of the area of interest 330. FIG. 4 illustrates a side view of the product/plane frame 320 and the area of interest 330. As further illustrated in FIG. 4, while the sensing of the geometric imaging locus 410 may be off-nadir, the system orthorectifies the images as indicated at 420. As further illustrated in FIG. 4, the geometric imaging locus 410 intersects the digital elevation matrix 430. The evaluation of the rational polynomial coefficients (RPC) of a sensor model is performed using the heights from the digital elevation matrix 430. The effect is that every pixel appears as if it was viewed from nadir.

More specifically, the nominal output space (product space) sampling distance is computed using a minimum ground sample distance (GSD) from the four image corners. The GSDs at the image corners are computed using the rational polynomial coefficients. Then, for each digital elevation map post (latitude, longitude), a map projection of the X,Y coordinate is computed. The map projection, e.g. the Universal Transverse Mercator (UTM), provides plane coordinates in meters as a function of the geodetic latitude and longitude. The latitude, longitude, and elevation of the digital elevation map value is projected to the s, 1 of the original image using the rational polynomial coefficients. This provides X,Y=>s, 1 conjugates at a grid of X,Y points consistent with digital elevation map post spacing. The X,Y coordinates are transformed to output space raster coordinates. For each integer output raster coordinate, the raster coordinates are transformed to X,Y map coordinates. Bilinear interpolation of the XY−>s, 1 is used to map and obtain the s, 1 coordinates for the integer output raster coordinate. The imagery pixel intensities are resampled at s, 1 to output raster space. Pixel interpolation can be performed using nearest neighbor, bilinear, and/or bicubic techniques.

Figure 5:
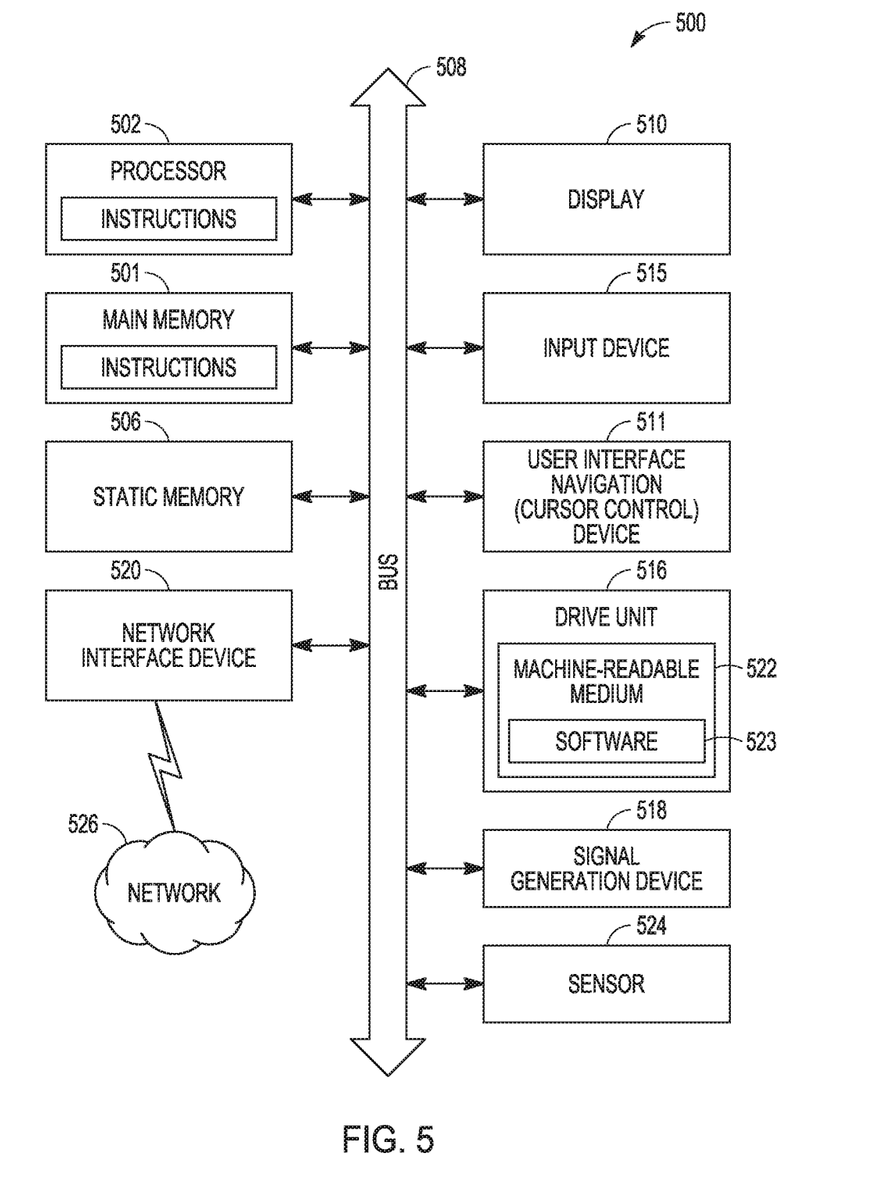
FIG. 5 is a block diagram of a computer system upon which one or more of the disclosed embodiments can execute.

FIG. 5 is a block diagram of a machine in the form of a computer system within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in a client-server network environment, or as a peer machine in peer-to-peer (or distributed) network environment. In a preferred embodiment, the machine will be a server computer, however, in alternative embodiments, the machine may be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 500 includes a processor 502 (e.g., a central processing unit (CPU), a graphics processing unit (GPU) or both), a main memory 501 and a static memory 506, which communicate with each other via a bus 508. The computer system 500 may further include a display unit 510, an alphanumeric input device 517 (e.g., a keyboard), and a user interface (UI) navigation device 511 (e.g., a mouse). In one embodiment, the display, input device and cursor control device are a touch screen display. The computer system 500 may additionally include a storage device 516 (e.g., drive unit), a signal generation device 518 (e.g., a speaker), a network interface device 520, and one or more sensors 524, such as a global positioning system sensor, compass, accelerometer, or other sensor.

The drive unit 516 includes a machine-readable medium 522 on which is stored one or more sets of instructions and data structures (e.g., software 523) embodying or utilized by any one or more of the methodologies or functions described herein. The software 523 may also reside, completely or at least partially, within the main memory 501 and/or within the processor 502 during execution thereof by the computer system 500, the main memory 501 and the processor 502 also constituting machine-readable media.

While the machine-readable medium 522 is illustrated in an example embodiment to be a single medium, the term "machine-readable medium" may include a single medium or multiple media (e.g., a centralized or distributed database, and/or associated caches and servers) that store the one or more instructions. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks.

The software 523 may further be transmitted or received over a communications network 526 using a transmission medium via the network interface device 520 utilizing any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., Wi-Fi® and WiMax® networks). The term "transmission medium" shall be taken to include any intangible medium that is capable of storing, encoding or carrying instructions for execution by the machine, and includes digital or analog communications signals or other intangible medium to facilitate communication of such software.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

The invention claimed is:

1. A process to generate a geopositioned ortho mosaic image comprising:
   receiving into a computer processor one or more of digital images of a geographic location, a terrain elevation dataset, a geographic extent for a mosaic image, and a set of reference stereo images;
   selecting a first subset of images from the digital images, the first subset comprising images having a ground overlap in common;
   selecting a second subset of images from the first subset of images based on one or more of an age of the digital images, collection geometry of the digital images, a percentage of cloud cover associated with the digital images, a quality of the digital images, and a ground footprint of the digital images;
   for each digital image in the second subset, using the set of reference stereo images, associating each digital image in the second subset with ground control points in the set of reference stereo images;
   for each digital image in the second subset, associating each digital image to each other digital image in the second subset via image to image tiepoints;
   updating a geometry of each image via a bundle adjustment to generate images with improved geopositional accuracy and consistent geopositions;
   using a prioritized stacking order, establishing piecewise linear seam lines between each of the images in the second subset;
   building a prioritized map in a mosaic space specifying the source image pixels that are used in each region of the output mosaic;
   forming the mosaic image using the prioritized map; and
   formatting the mosaic image according to a specification.

2. The process of claim 1, comprising orthorectifying each image at a particular resolution using a digital elevation model (DEM).

3. The process of claim 1, comprising modifying intensities of each image in the second subset such that each image in the second subset falls within a certain intensity range.

4. The process of claim 1, comprising using a digital elevation model (DEM) source as a vertical control to reduce shear or other image discontinuities in the mosaic image.

5. The process of claim 1, comprising detecting clouds in the images of the second subset and removing the images with clouds from the mosaic.

6. The process of claim 1, comprising compressing the mosaic image.

7. The process of claim 6, wherein the compressing the mosaic image comprises using a vector quantization compression algorithm, a Joint Photographic Experts Group (JPEG) compression, or a Portable Network Graphic (PNG) compression.

8. The process of claim 1, comprising executing the process to generate a geopositioned ortho mosaic image via a plurality of end to end scripts.

9. The process of claim 1, comprising executing the process to generate a geopositioned ortho mosaic image on a plurality of servers.

10. A non-transitory computer-readable medium comprising instructions to execute a process to generate a geopositioned ortho mosaic image, the process comprising:
    receiving into a computer processor one or more of digital images of a geographic location, a terrain elevation dataset, a geographic extent for a mosaic image, and a set of reference stereo images;
    selecting a first subset of images from the digital images, the first subset comprising images having a ground overlap in common;
    selecting a second subset of images from the first subset of images based on one or more of an age of the digital images, collection geometry of the digital images, a percentage of cloud cover associated with the digital images, a quality of the digital images, and a ground footprint of the digital images;
    for each digital image in the second subset, using the set of reference stereo images, associating each digital image in the second subset with ground control points in the set of reference stereo images;
    for each digital image in the second subset, associating each digital image to each other digital image in the second subset via image to image tiepoints;
    updating a geometry of each image via a bundle adjustment to generate images with improved geopositional accuracy and consistent geopositions;

using a prioritized stacking order, establishing piecewise linear seam lines between each of the images in the second subset;

building a prioritized map in a mosaic space specifying the source image pixels that are used in each region of the output mosaic;

forming the mosaic image using the prioritized map; and formatting the mosaic image according to a specification.

11. The non-transitory computer-readable medium of claim 10, comprising instructions for orthorectifying each image at a particular resolution using a digital elevation model (DEM).

12. The non-transitory computer-readable medium of claim 10, comprising instructions for using a digital elevation model (DEM) source as a vertical control to reduce shear or other image discontinuities in the mosaic image.

13. The non-transitory computer-readable medium of claim 10, comprising instructions for detecting clouds in the images of the second subset and removing the images with clouds from the mosaic.

14. The non-transitory computer-readable medium of claim 10, comprising instructions for executing the process to generate a geopositioned ortho mosaic image via a plurality of end to end scripts.

15. The non-transitory computer-readable medium of claim 10, comprising instructions for executing the process to generate a geopositioned ortho mosaic image on a plurality of servers.

16. A computer system comprising:
a computer processor; and
a computer memory coupled to the computer processor;
wherein the computer processor is operable to execute a process comprising:
receiving one or more of digital images of a geographic location, a terrain elevation dataset, a geographic extent for a mosaic image, and a set of reference stereo images;
selecting a first subset of images from the digital images, the first subset comprising images having a ground overlap in common;
selecting a second subset of images from the first subset of images based on one or more of an age of the digital images, collection geometry of the digital images, a percentage of cloud cover associated with the digital images, a quality of the digital images, and a ground footprint of the digital images;
for each digital image in the second subset, using the set of reference stereo images, associating each digital image in the second subset with ground control points in the set of reference stereo images;
for each digital image in the second subset, associating each digital image to each other digital image in the second subset via image to image tiepoints;
updating a geometry of each image via a bundle adjustment to generate images with improved geopositional accuracy and consistent geopositions;
using a prioritized stacking order, establishing piecewise linear seam lines between each of the images in the second subset;
building a prioritized map in a mosaic space specifying the source image pixels that are used in each region of the output mosaic;
forming the mosaic image using the prioritized map; and
formatting the mosaic image according to a specification.

17. The computer system of claim 16, wherein the computer processor is operable for orthorectifying each image at a particular resolution using a digital elevation model (DEM).

18. The computer system of claim 16, wherein the computer processor is operable for using a digital elevation model (DEM) source as a vertical control to reduce shear or other image discontinuities in the mosaic image.

19. The computer system of claim 16, wherein the computer processor is operable for generating the geopositioned ortho mosaic image via a plurality of end to end scripts.

20. The computer system of claim 16, wherein the computer processor is operable for generating the geopositioned ortho mosaic image on a plurality of servers.

* * * * *

UNITED STATES PATENT AND TRADEMARK OFFICE
CERTIFICATE OF CORRECTION

PATENT NO. : 11,087,532 B2  
APPLICATION NO. : 16/674868  
DATED : August 10, 2021  
INVENTOR(S) : Verret et al.

Page 1 of 1

It is certified that error appears in the above-identified patent and that said Letters Patent is hereby corrected as shown below:

In the Specification

In Column 5, Line 35, delete "CM" and insert --CIB-- therefor

In Column 7, Line 67, delete "517" and insert --515-- therefor

Signed and Sealed this  
Sixteenth Day of November, 2021

Drew Hirshfeld  
*Performing the Functions and Duties of the*  
*Under Secretary of Commerce for Intellectual Property and*  
*Director of the United States Patent and Trademark Office*